United States Patent [19]

Nakaura

[11] Patent Number: 5,257,730
[45] Date of Patent: Nov. 2, 1993

[54] BOUND STOPPER FOR VEHICLE SUSPENSION HAVING RUBBER AND FOAM ELASTIC BODIES

[75] Inventor: Hiroaki Nakaura, Kasugai, Japan
[73] Assignee: Tokai Rubber Industries, Ltd., Japan
[21] Appl. No.: 910,770
[22] Filed: Jul. 8, 1992
[30] Foreign Application Priority Data
   Jul. 19, 1991 [JP] Japan .................................. 3-64647
[51] Int. Cl.[5] ................................................ F16F 3/08
[52] U.S. Cl. .................................. 267/220; 267/140.3
[58] Field of Search ............... 267/220, 219, 153, 154, 267/292, 293, 140.3, 136; 188/322.12

[56] References Cited

U.S. PATENT DOCUMENTS

| | | | |
|---|---|---|---|
| 3,347,541 | 10/1967 | Buccino | 267/220 |
| 3,606,295 | 9/1971 | Appleton | 267/140.3 |
| 4,235,426 | 11/1980 | Sullivan, Jr. et al. | 267/220 |
| 4,416,446 | 11/1983 | Murakami | 267/140.3 |
| 4,462,608 | 7/1984 | Lederman | 267/220 |
| 4,673,314 | 6/1987 | Hara et al. | 267/140.3 |
| 4,712,775 | 12/1987 | Buma et al. | 267/220 |
| 4,771,463 | 12/1987 | Knable et al. | 280/668 |
| 4,804,169 | 2/1989 | Hassan | 267/220 |
| 4,858,880 | 8/1989 | Durand | 267/140.3 |
| 5,052,665 | 10/1991 | Sakuragi | 267/220 |
| 5,158,269 | 10/1992 | Hein et al. | 267/140.3 |

FOREIGN PATENT DOCUMENTS 2200717  8/1988  United Kingdom ............... 267/220

Primary Examiner—Matthew C. Graham
Attorney, Agent, or Firm—Parkhurst, Wendel & Rossi

[57] ABSTRACT

A bound stopper for use in a suspension of a motor vehicle, which is fitted on a piston rod of a shock absorber of the suspension, for elastically limiting a stroke of the piston rod by abutting contact with a cylinder of the shock absorber. The bound stopper includes a cylindrical main elastic body formed of a rubber material and having an engaging portion at one axial end on the side of the cylinder of the shock absorber, and a cylindrical auxiliary elastic body formed of a foam material and having an engaging portion at one axial end remote from the cylinder of the shock absorber, one of the engaging portions of the main and auxiliary elastic bodies having at least one recess while the other of the engaging portions having at least one protrusion. The engaging portion of the auxiliary elastic body is fitted on the engaging portion of the main elastic body such that the protrusion is fitted in the corresponding recess for engagement of the two elastic bodies.

8 Claims, 4 Drawing Sheets

BOUND STOPPER FOR VEHICLE SUSPENSION HAVING RUBBER AND FOAM ELASTIC BODIES

BACKGROUND OF THE INVENTION

1. Field of the Invention

The present invention relates in general to a bound stopper installed on a suspension system of a motor vehicle, which stopper is fitted on a piston rod of a shock absorber, and more particularly to such a bound stopper of a composite type which exhibits a nonlinear spring characteristic.

2. Discussion of the Prior Art

In one type of vehicle suspension for supporting the vehicle body via a shock absorber, there is used a buffer or cushioning member generally called "bound stopper" (also called "bumper spring" or "bound bumper"), for elastically limiting an excessive amount of stroke of the shock absorber. The bound stopper is a generally cylindrical member formed of an elastic material, and is fitted on a piston rod of the shock absorber and thus installed on the suspension. This bound stopper is adapted to abut on a cylinder of the shock absorber upon oscillating movement of the piston rod, so as to elastically limit the amount of stroke of the piston rod.

The bound stopper as described above is desirable to have a so-called nonlinear spring characteristic. Namely, the bound stopper is required to exhibit a soft spring characteristic when the stroke of the shock absorber is relatively small, so as to assure good driving comfort, and exhibits a hard spring characteristic when the stroke is relatively large, so as to assure good driving stability and controllability.

However, it is difficult for the conventional bound stopper formed of a rubber material to provide a sufficiently reduced spring constant when the stroke is small. In the case of the bound stopper formed of a foam material such as urethane foam, it is difficult to determine the maximum stroke of the shock absorber while assuring a suitable buffer clearance (the stroke of the bound stopper abutting on the cylinder of the shock absorber). Thus, the bound stopper in the form of a foam elastic body does not function satisfactorily as a stopper for limiting the stroke of the shock absorber.

In recent years, there is proposed a composite type of bound stopper which consists of two members which are separately formed and generally cylindrical, i.e., a rubber elastic body and a foam elastic body, which are bonded together in the axial direction by means of an instantaneous adhesive agent. The bound stopper of this composite type exhibits a soft spring characteristic based on elastic deformation of the foam elastic body when the stroke is relatively small, and effectively functions as a stopper for limiting the stroke of the shock absorber by use of the rubber elastic body, when the stroke is relatively large.

In the bound stopper of the above composite type, it is difficult to stably ensure a sufficiently high degree of bonding strength between the rubber elastic body and the foam elastic body. Therefore, these two elastic bodies are likely to be separated from each other during transportation of the bound stopper prior to its mounting on the shock absorber, for example, causing difficulties in handling the stopper and some problem in assembling the motor vehicle.

Even if the rubber and foam elastic bodies are secured to each other upon installation of the bound stopper on the motor vehicle, these two elastic bodies, which are repetitively deformed during the use of the stopper, tend to be separated from each other after a short period of use, due to a difference in the load-strain characteristics between the rubber and foam elastic bodies, for example. Since the cylindrical foam elastic body is not supported by any member after separation of the two elastic bodies, there tends to arise noise or vibrations due to abutting contact of the foam elastic body with the rod or piston of the shock absorber. In this condition, the cylindrical foam elastic body may be compressed while it is placed in eccentric relation with the cylindrical rubber elastic body, causing irregular deformation, such as buckling, to these rubber and foam elastic bodies. Thus, the durability of the bound stopper is considerably deteriorated.

SUMMARY OF THE INVENTION

It is therefore an object of the present invention to provide a bound stopper for use in a vehicle suspension, which has a simple, easy-to-manufacture composite structure consisting of a rubber elastic body and a foam elastic body that are joined together with increased strength.

The above object may be attained according to the principle of the present invention, which provides a bound stopper for use in a suspension of a motor vehicle, which is fitted on a piston rod of a shock absorber of the suspension, for elastically limiting a stroke of the piston rod by abutting contact with a cylinder of the shock absorber, comprising: a generally cylindrical main elastic body formed of a rubber material and having an engaging portion at one of axially opposite open ends thereof on the side of the cylinder of the shock absorber; and a generally cylindrical auxiliary elastic body formed of a foam material and having an engaging portion at one of axially opposite open ends thereof remote from the cylinder of the shock absorber, one of the engaging portions of the main and auxiliary elastic bodies having at least one recess while the other of the engaging portions having at least one protrusion. The engaging portion of the auxiliary elastic body is fitted on the engaging portion of the main elastic body such that the above-indicated at least one protrusion is fitted in the above-indicated at least one recess for engagement of the main and auxiliary elastic bodies.

In the bound stopper constructed according to the present invention, the main elastic body formed of a rubber material and the auxiliary elastic body formed of a foam material are joined together with the engagement of the recess(es) and protrusion(s) formed at the engaging portions of the two elastic bodies. Thus, the rubber and foam elastic bodies are joined with improved efficiency, stably assuring sufficiently high joining strength therebetween. Thus, the rubber and foam elastic bodies are favorably prevented from being separated from each other prior to installation of the stopper on the vehicle.

In the present bound stopper, the engaging portion of the auxiliary elastic body is fitted on the engaging portion of the main elastic body. When the bound stopper installed on the vehicle undergoes compressive deformation in the axial direction, therefore, a significantly increased force of engagement occurs between the main and auxiliary elastic bodies, based on a difference in the amount of radial expansion between the two elastic bodies. Thus, the main and auxiliary elastic bodies are effectively prevented from being separated from each other during use of the bound stopper.

BRIEF DESCRIPTION OF THE DRAWINGS

The above and optional objects, features and advantages of the present invention will become more apparent by reading the following detailed description of a presently preferred embodiment of the present invention, when considered in connection with the accompanying drawings, in which.

DETAILED DESCRIPTION OF THE PREFERRED EMBODIMENT

Figure 1:
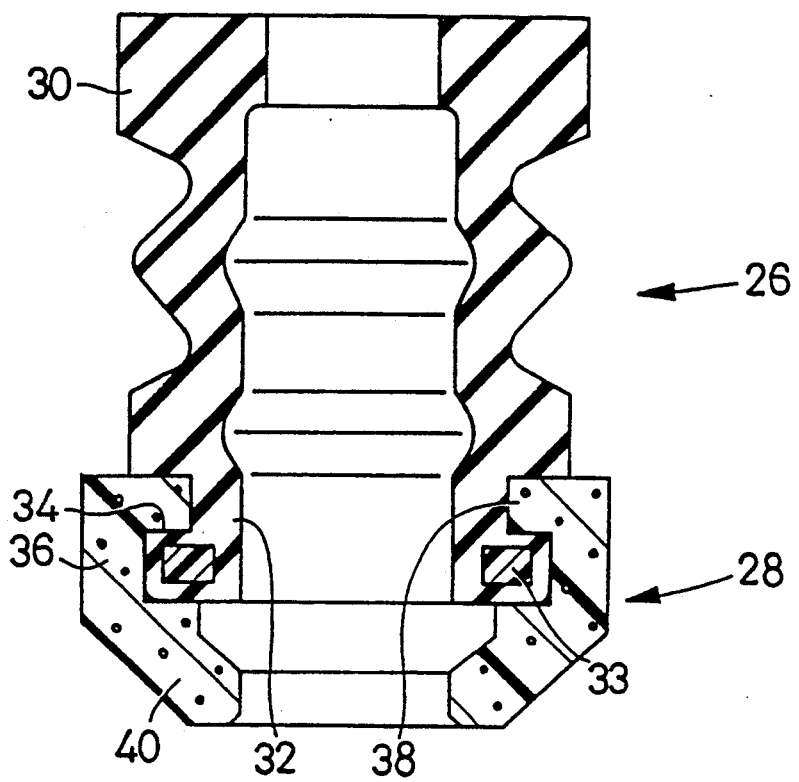
FIG. 1 is an elevational view in axial cross section of one embodiment of the present invention in the form of a bound stopper for use in a suspension of a motor vehicle.
Figure 4:
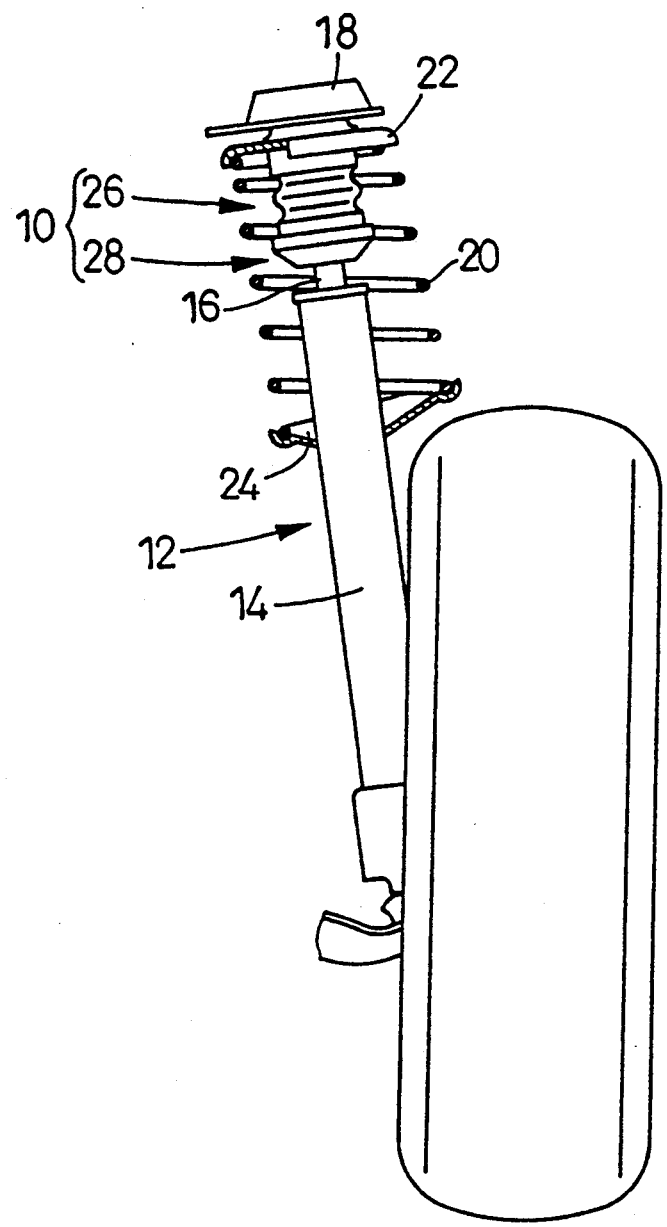
FIG. 4 is a view schematically showing the bound stopper of FIG. 1 as installed on the vehicle suspension.

Referring first to FIG. 4, there is shown a principal part of a suspension system of an automobile, which includes one embodiment of the present invention in the form of a bound stopper 10 as shown in FIG. 1. In FIG. 4, reference numeral 12 denotes a shock absorber which functions to damp vibrations transmitted from an axle toward the vehicle body. The shock absorber 12 has a cylinder 14 which is connected at its lower end to a knuckle on the side of the axle, and a piston rod 16 which is connected at its upper end to a suspension insulator 18 disposed on the side of the vehicle body. In the same figure, reference numeral 20 denotes a coil spring which flexibly supports the axle with respect to the vehicle body so as to alleviate vibrations and shocks transmitted from a road surface. The coil spring 20 is interposed between an upper spring sheet 22 provided on the suspension insulator 18, and a lower spring sheet 24 fixed to the outer circumferential surface of the cylinder 14. The bound stopper 10 having a generally cylindrical shape is fitted on the piston rod 16 of the shock absorber 12, such that the upper end of the stopper 10 is supported by the upper spring sheet 22 of the suspension insulator 18 while the lower end is opposed to the upper end face of the cylinder 14 with a suitable spacing therebetween.

More specifically described with reference to FIG. 1, the bound stopper 10 consists of a cylindrical main elastic body 26, and a cylindrical auxiliary elastic body 28 which is fixedly attached to one of axially opposite open end portions of the main elastic body 26.

Figure 2:
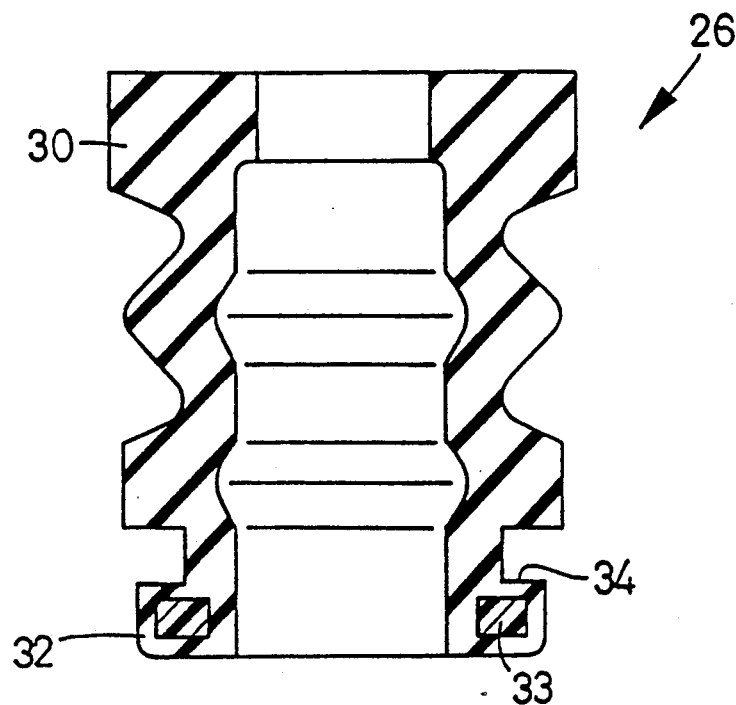
FIG. 2 is an axial cross sectional view showing a main elastic body of the bound stopper of FIG. 1.

The main elastic body 26 is an elastic body formed of a rubber material, and has an axially intermediate, thick bellows-like portion, as shown in FIG. 2. This bellows-like portion extends over a suitable axial length so as to provide a desired spring constant in the axial direction. The bellows-like portion serves to prevent irregular deformation, such as buckling, of the main elastic body 26 when it receives a compressive load in the axial direction, and to limit a change in the radial dimension of the main elastic body 26, i.e., the amount of radial expansion of the body 26.

The main elastic body 26 includes a thick-walled cylindrical mounting portion 30 formed at one of opposite axial ends thereof. The main elastic body 26 is installed in position with the mounting portion 30 fixed to the suspension insulator 18.

The main elastic body 26 further includes a generally cylindrical engaging portion 32 formed at the other axial end on the side of the cylinder 14 of the shock absorber 12. The engaging portion 32 has a recess in the form of an annular groove 34 formed in its outer surface over the entire circumference thereof. This annular groove 34 is located a suitable distance axially inwardly of the opening of the engaging portion 32.

The engaging portion 32 of the main elastic body 26 is provided with an annular reinforcing rigid ring 33 embedded in its open end portion. The reinforcing ring 33 serves to prevent irregular deformation of the engaging portion 32, and maintain the generally cylindrical shape of this portion 32 even upon application of external force. The reinforcing ring 33 may be formed of any rigid material provided the ring 33 is able to effectively prevent irregular deformation of the engaging portion 32. For example, a resin ring or a wire ring is favorably used as the reinforcing ring 33.

Figure 3:
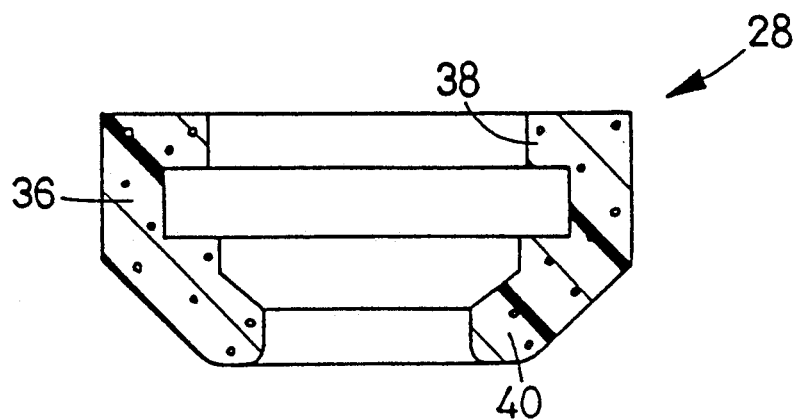
FIG. 3 is an axial cross sectional view showing an auxiliary elastic body of the bound stopper of FIG. 1.

On the other hand, the auxiliary elastic body 28, which is formed separately from the main elastic body 26, is a foam elastic body formed of a foam material such as urethane foam or rubber foam. As shown in FIG. 3, the auxiliary elastic body 28 has a cylindrical engaging portion 36 formed at its one axial end, which has an inside diameter that is almost equal to or slightly smaller than the outside diameter of the engaging portion 32 of the main elastic body 26. The engaging portion 36 is formed with an annular protrusion 38 which protrudes radially inwards from the open end portion thereof to extend over the entire circumference of the portion 36. This annular protrusion 38 has dimensions which correspond to those of the annular groove 34 formed in the engaging portion 32 of the main elastic body 26.

The auxiliary elastic body 28 further has an abutting portion 40 formed at the other axial end thereof, which protrudes from the engaging portion 36 in the axial direction. This abutting portion 40 is formed in tapered configuration with its diameter gradually reduced toward the other axial end of the body 28.

The thus constructed auxiliary elastic body 28 is assembled with the main elastic body 26 by engaging the engaging portions 32, 36 of the main and auxiliary bodies 26, 28 with each other so that the annular protrusion 38 of the auxiliary elastic body 28 is fitted in the annular groove 34 of the main elastic body 26, as shown in FIG. 1. In this manner, the intended bound stopper 10 is obtained.

The bound stopper 10 is fitted on the piston rod 6 of the shock absorber 12, and thus installed in position as shown in FIG. 4. When a relatively large vibrational load is applied from a wheel to the bound stopper 10 installed in position, the abutting portion 40 of the auxiliary elastic body 28 abuts on the cylinder 14, whereby the stopper 10 undergoes compressive deformation in the axial direction between the cylinder 14 and the suspension insulator 18. Thus, the bound stopper 10 is adapted to elastically limit the stroke of the piston rod 16 of the shock absorber 12, namely, the stroke of the wheel with respect to the vehicle body.

Figure 5:
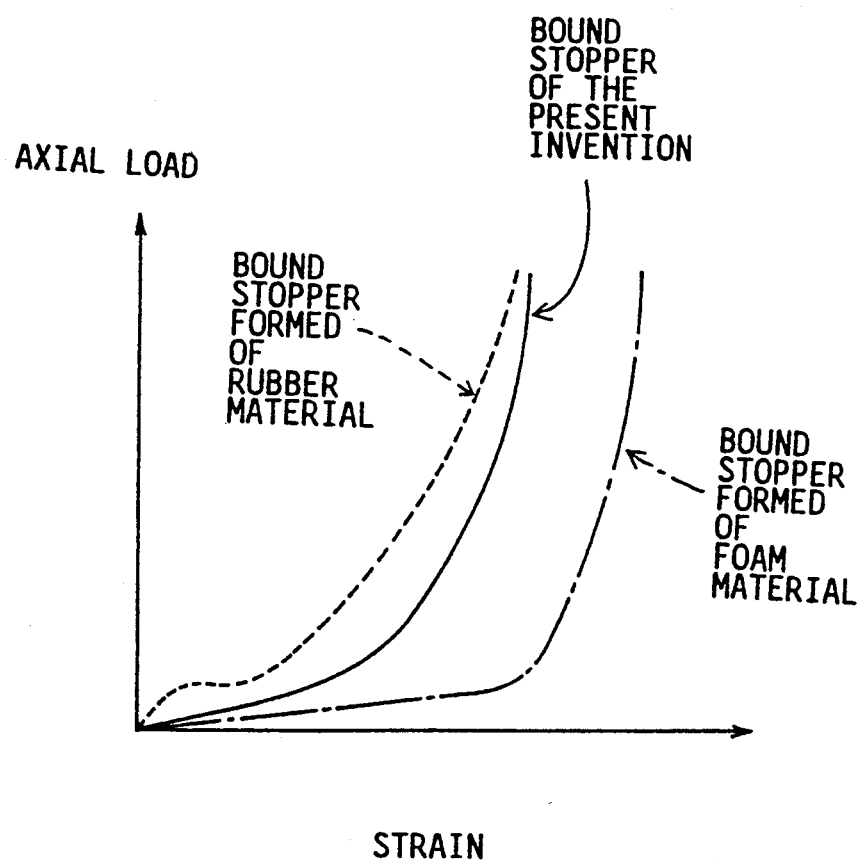
FIG. 5 is a graph indicating load-strain characteristics of the bound stopper of FIG. 1 and comparative examples.

The bound stopper 10 has a composite structure consisting of the main elastic body 26 formed of a rubber material and the auxiliary elastic body 28 formed of a foam material. Accordingly, as is apparent from the graph of FIG. 5, the bound stopper 10 exhibits a relatively soft spring characteristic based on elastic deformation of the auxiliary elastic body 28 when the stroke of the piston rod 16 is relatively small, and exhibits a relatively hard spring characteristic owing to the main elastic body 26 when the stroke of the rod 16 is relatively large. Thus, the present bound stopper 10 achieves an excellent nonlinear spring characteristic, assuring improved shock absorbing effect and displacement limiting capability.

In the bound stopper 10 constructed as described above, the main elastic body 26 formed of a rubber material and the auxiliary elastic body 28 formed of a foam material are assembled together due to engagement of the annular protrusion 38 with the annular groove 34. Thus, the bound stopper 10 can be easily fabricated with improved efficiency, since the assembling of the two elastic bodies 26, 28 does not include any particular adhesive bonding process.

Further, the engagement of the annular protrusion 38 with the annular groove 34 assures a sufficiently high degree of joining strength between the main and auxiliary elastic bodies 26, 28, which is less likely to vary among the individual bound stoppers fabricated, as compared with when the two elastic bodies 26, 28 are bonded together with adhesives. With the dimensions (e.g., depth) of the annular groove and protrusion 34, 38 suitably determined, therefore, the main and auxiliary bodies 26, 28 are effectively prevented from being separated from each other before mounting thereof on the suspension system. Even in the case where the main and auxiliary elastic bodies 26, 28 are separated from each other, these bodies 26, 28 may be easily re-assembled, effectively reducing the number of defects, since the assembling procedure does not require the use of adhesives, for example.

In the instant bound stopper 10, the auxiliary elastic body 28 is fitted on the main elastic body 26 at the joining portion of these bodies. Therefore, when an axial vibrational load is applied to the bound stopper 10 installed on the automobile, causing repetitive compressive deformation of the main and auxiliary elastic bodies 26, 28 in the axial direction, the joining strength between these two elastic bodies 26, 28 can be favorably maintained, thereby effectively preventing these two bodies 26, 28 from being separated from each other. Thus, the instant bound stopper 10 exhibits remarkably improved durability, compared to the conventional counterpart using adhesives.

Namely, the rubber elastic body (26) has a Poisson ratio of about ½, and has a property that its volume is substantially kept at a given value even when the elastic body is deformed, while the foam elastic body (28) has a property that its volume is varied due to a change of the volume of bubbles within the body when the elastic body is deformed. Accordingly, when the bound stopper 10 receives an axial load which causes compressive deformation, the main rubber elastic body 26 is expanded radially outwards with its diameter accordingly increased, while the diameter of the auxiliary foam elastic body 28 is not so increased as that of the main elastic body 26. Upon application of the axial load to the bound stopper 10, therefore, the force of engagement of the annular groove 34 and annular protrusion 38 is further increased due to a difference in the amount of radial expansion between the main and auxiliary elastic bodies 26, 28, thereby assuring a sufficiently high degree of joining strength between the two elastic bodies 26, 28.

Moreover, in the instant embodiment, the reinforcing ring 33 embedded in the engaging portion 32 of the main elastic body 26 serves to prevent irregular deformation of the joining portion of the main and auxiliary elastic bodies 26, 28, so that the two elastic bodies 26, 28 are held in good engagement with each other even upon application of a load. With the increase in the force of engagement based on the difference in the amount of radial expansion between the main and auxiliary elastic bodies 26, 28, these elastic bodies 26, 28 are further effectively prevented from being separated from each other.

While the present invention has been described in detail in its presently preferred embodiment, for illustrated purpose only, it is to be understood that the invention is by no means limited to the details of the illustrated embodiment but may be otherwise embodied.

While the joining portion (annular groove and protrusion 34, 38) is formed over the entire circumference of the main and auxiliary elastic bodies 26, 28, a single or a plurality of joining portion or portions may be formed independently of each other in the circumferential direction of the bodies 26, 28.

The reinforcing ring 33 embedded in the engaging portion 32 of the main elastic body 26 is not necessarily provided, but may be eliminated when irregular deformation of the joining portion of the two elastic bodies can be sufficiently limited or avoided based on the elastic strength of the engaging portion 32.

Further, the reinforcing ring 33 may be provided in the auxiliary elastic body 28. Alternatively, an annular groove may be formed in the outer circumferential surface of the auxiliary elastic body 28, and a reinforcing ring may be fixedly received in the annular groove.

Moreover, the proportion of the axial length of the main rubber body 26 to the auxiliary foam body 28 may be suitably changed as needed, depending upon the required damping and other characteristics of the bound stopper. For instance, the axial length of the auxiliary elastic body 28 may be made larger than that of the main elastic body 26, with the auxiliary elastic body 28 including a bellows-like portion.

It is to be understood that the present invention may be embodied with various other changes, modifications and improvements which may occur to those skilled in the art, without departing from the spirit and scope of the invention as defined in the following claims.

What is claimed is:

1. A bound stopper for use in a suspension of a motor vehicle, which is fitted on a piston rod of a shock absorber of the suspension, for elastically limiting a stroke of the piston rod by abutting contact with a cylinder of the shock absorber, comprising:

a generally cylindrical main elastic body formed of a rubber material and having a first engaging portion at one of axially opposite open ends thereof on the side of the cylinder of the shock absorber; and a generally cylinder auxiliary elastic body formed of a foam material and having a second engaging portion at one of axially opposite open ends thereof remote from the cylinder of the shock absorber, one of said first and second engaging portions of the main and auxiliary elastic bodies having at least one recess while the other of said first and second engaging portions having at least one protrusion, the second engaging portion of the auxiliary elastic body being located radially outwardly of axially corresponding portions of said first engaging portion of said main elastic body, and engaging said first engaging portion such that said at least one protrusion is fitted in said at least one recess for engagement of the main and auxiliary elastic bodies.

2. A bound stopper according to claim 1, wherein said at least one recess consists of one recess, and said at least one protrusion consists of one protrusion.

3. A bound stopper according to claim 2, wherein said first engaging portion of said main elastic body has an annular groove as said at least one recess while said second engaging portion of said auxiliary elastic body has an annular protrusion as said at least one protrusion, said annular protrusion being received in said annular recess.

4. A bound stopper according to claim 1, further comprising a reinforcing rigid ring embedded in said first engaging portion of said main elastic body.

5. A bound stopper according to claim 1, wherein said main elastic body further has an axially intermediate bellows-like portion.

6. A bound stopper according to claim 1, wherein said auxiliary elastic body further has a tapered portion at the other axial open end remote from said main elastic body.

7. A bound stopper according to claim 1, wherein said auxiliary elastic body is formed of urethane foam.

8. A bound stopper for use in a suspension of a motor vehicle, which is fitted on a piston rod of a shock absorber of the suspension, for elastically limiting a stroke of the piston rod by abutting contact with a cylinder of the shock absorber, comprising:

a generally cylindrical bellows shaped main elastic body formed of a rubber material and having a first engaging portion at one of axially opposite open ends thereof on the side of the cylinder of the shock absorber; and a generally cylindrical auxiliary elastic body formed of a foam material and having a second engaging portion at one of axially opposite open ends thereof remote from the cylinder of the shock absorber, one of said first and second engaging portions of the main and auxiliary elastic bodies having at least one recess while the other of said first and second engaging portions having at least one protrusion, the second engaging portion of the auxiliary elastic body being fitted on said first engaging portion of the main elastic body such that said at least one protrusion is fitted in said at least one recess for engagement of the main and auxiliary elastic bodies.

* * * * *